United States Patent
Nakamoto

(10) Patent No.: US 9,083,240 B2
(45) Date of Patent: Jul. 14, 2015

(54) DC-DC CONVERTER AND PORTABLE DEVICE

(71) Applicant: FUJITSU LIMITED, Kawasaki-shi, Kanagawa (JP)

(72) Inventor: Hiroyuki Nakamoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 283 days.

(21) Appl. No.: 13/692,823

(22) Filed: Dec. 3, 2012

(65) Prior Publication Data

US 2013/0257408 A1    Oct. 3, 2013

(30) Foreign Application Priority Data

Mar. 28, 2012    (JP) .................................. 2012-073412

(51) Int. Cl.
*H02M 3/158*    (2006.01)

(52) U.S. Cl.
CPC .................................. *H02M 3/1582* (2013.01)

(58) Field of Classification Search
CPC ........................................................ H02M 3/1582
USPC ................................... 323/259, 282, 284, 288
See application file for complete search history.

(56) References Cited

U.S. PATENT DOCUMENTS

| | | | | |
|---|---|---|---|---|
| 7,432,689 | B2 * | 10/2008 | Miller et al. | 323/259 |
| 7,443,147 | B2 * | 10/2008 | Kasai et al. | 323/259 |
| 7,768,245 | B1 * | 8/2010 | De Cremoux | 323/259 |
| 7,777,467 | B2 * | 8/2010 | Nishida | 323/282 |
| 8,305,055 | B2 * | 11/2012 | Wu et al. | 323/259 |
| 8,564,259 | B2 * | 10/2013 | Chen et al. | 323/259 |
| 8,823,340 | B2 * | 9/2014 | Chen et al. | 323/259 |
| 2005/0116697 | A1 | 6/2005 | Matsuo et al. | |
| 2005/0206354 | A1 | 9/2005 | Ikezawa | |
| 2006/0238182 | A1 * | 10/2006 | Yoshino | 323/282 |
| 2009/0167259 | A1 | 7/2009 | Miyamae | |
| 2009/0201003 | A1 * | 8/2009 | Kobori et al. | 323/284 |
| 2011/0074373 | A1 * | 3/2011 | Lin | 323/282 |
| 2012/0313608 | A1 * | 12/2012 | Chen et al. | 323/283 |
| 2013/0307508 | A1 * | 11/2013 | Hallak | 323/282 |
| 2014/0084883 | A1 * | 3/2014 | Tanabe | 323/271 |

FOREIGN PATENT DOCUMENTS

| | | |
|---|---|---|
| JP | 62-006521 A | 1/1987 |
| JP | 2005-160254 A | 6/2005 |
| JP | 2005-192312 A | 7/2005 |
| JP | 2006-304512 A | 11/2006 |
| JP | 2009-159703 A | 7/2009 |

* cited by examiner

*Primary Examiner* — Fred E Finch, III
(74) *Attorney, Agent, or Firm* — Arent Fox LLP

(57) ABSTRACT

A DC-DC converter includes: a step-up-or-step-down circuit including a choke coil and step-down and step-up transistor pairs; and a control circuit to control the transistor pairs based on an output voltage, wherein the control circuit includes: a differential triangular wave generation circuit to generate a positive-phase triangular wave signal and a negative-phase triangular wave signal; a switch to select the positive-phase triangular wave signal or the negative-phase triangular wave signal in response to a switching signal; an error detector to output an error signal; a PWM comparator to compare the positive-phase triangular wave signal or the negative-phase triangular wave signal with the error signal to generate a control pulse signal; a switching comparator to compare the error signal with reference potential and generate the switching signal; and a driver control circuit to generate a control signal for the transistor pairs based on the control pulse signal and the switching signal.

4 Claims, 10 Drawing Sheets

US 9,083,240 B2

DC-DC CONVERTER AND PORTABLE DEVICE

CROSS-REFERENCE TO RELATED APPLICATION(S)

This application is based upon and claims the benefit of priority of the prior Japanese Patent Application No. 2012-73412, filed on Mar. 28, 2012, the entire contents of which are incorporated herein by reference.

FIELD

The embodiments discussed herein are related to a DC-DC converter and a portable device equipped therewith.

BACKGROUND

A power circuit for a portable device or the like, for example, a DC-DC converter, supplies a power-supply voltage desired for each IC from an input voltage. With respect to power obtained from a battery cell or a battery, the DC-DC converter supplies an adequate power source so as to satisfy a power-supply voltage and an allowable current that are desired for each IC. The DC-DC converter is used for a wireless communication terminal, a tablet terminal, or the like.

A Related technique is disclosed in Japanese Laid-open Patent Publication No. 2006-304512, Japanese Laid-open Patent Publication No. 2009-159703, Japanese Laid-open Patent Publication No. 2005-192312, Japanese Examined Patent Application Publication No. 7-10043, or Japanese Laid-open Patent Publication No. 2005-160254.

SUMMARY

According to one aspect of the embodiments, a DC-DC converter includes: a step-up-or-step-down circuit including a choke coil, a pair of step-down transistors coupled to the choke coil and a pair of step-up transistors coupled to the choke coil; and a control circuit configured to control the pair of step-up transistors and the pair of step-down transistors based on an output voltage, wherein the control circuit includes: a differential triangular wave generation circuit configured to generate a positive-phase triangular wave signal and a negative-phase triangular wave signal; a switch configured to select one of the positive-phase triangular wave signal and the negative-phase triangular wave signal in response to a switching signal; an error detector configured to output an error signal according to a difference voltage between the output voltage and a certain voltage; a PWM comparator configured to compare one of the positive-phase triangular wave signal and the negative-phase triangular wave signal that is output by the switch with the error signal and to generate, in response to a comparison result, a control pulse signal having a pulse width according to the difference voltage; a switching comparator configured to compare the error signal with a reference voltage and generate the switching signal; and a driver control circuit configured to generate a control signal for the pair of step-up transistors and the pair of step-down transistors based on the control pulse signal and the switching signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
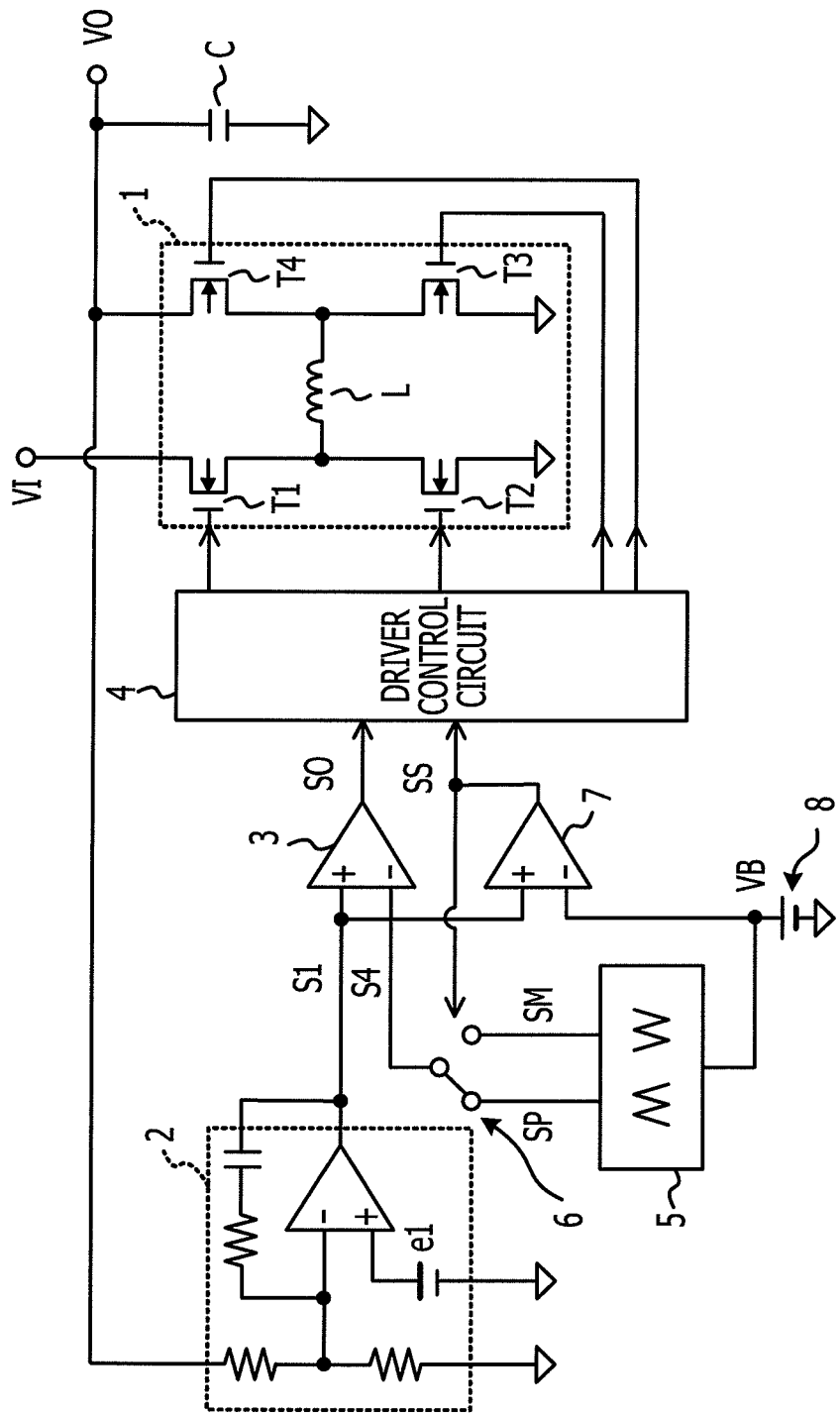
FIG. 1 illustrates an exemplary H-bridge type step-up-or-step-down DC-DC converter.

In a compact portable device, as a battery cell (battery), a lithium-ion storage battery is used that has a characteristic that full charge corresponds to 4.2 V and a final voltage is 2.5 V. In order to use the battery cell for a long time, a DC-DC converter that permits the voltage of the battery cell to change performs a step-up operation when a power-supply voltage desirable for an IC is higher than the voltage of the battery cell, and performs a step-down operation when a power-supply voltage desirable for an IC is lower than the voltage of the battery cell. The step-up and step-down operations may be executed using the same chip or the same circuit.

A step-up-or-step-down type DC-DC converter that performs step-up and step-down may be, for example, an H-bridge type step-up-or-step-down DC-DC converter. The H-bridge type step-up-or-step-down DC-DC converter includes a choke coil, a transistor pair for step-down and a transistor pair for step-up which are coupled to the choke coil, and a control circuit that performs on-off control on a transistor based on an output voltage. The control circuit switches between a step-up mode and a step-down mode in response to the output voltage, and generates a Pulse Width Modulation (PWM) signal for controlling on and off of a transistor. In a state where the fluctuation (ripple) of the output voltage is small, and on low power, the control circuit swiftly performs mode switching between the step-up and the step-down.

The PWM signal for performing on-off control on a transistor is generated using a triangular wave signal.

When a shift voltage used for shifting the DC potential of a triangular wave is larger than the amplitude of a triangular wave, even if a signal input to an inverting terminal of a PWM comparator is switched to a shifted signal, it is difficult for the shifted signal to be crossed over a signal before shift, and an interval of time may occur for which the PWM signal is not generated.

When the shift voltage is smaller than the amplitude of the triangular wave, both triangular waves are crossed over the potential of the same signal serving as a target for comparison. Therefore, the number of switching operations increases, and a consumption current may be increased.

When, by detecting that the transition of the PWM signal does not occur within the period of a pulse signal, the shift of the triangular wave is switched, a wait time corresponding to one period of a clock signal has occurred since a voltage signal corresponding to the output voltage and the triangular wave signal stopped being crossed over each other, and responsiveness may be lowered.

In the control circuit in the step-up-or-step-down DC-DC converter, since there is a dependence property between the shift voltage and the amplitude of the triangular wave, manual adjustment or automatic adjustment may be performed so as to adequately control the shift voltage.

In the H-bridge type step-up-or-step-down DC-DC converter, since a step-up type and a step-down type are formed using one inductor and a capacitor, a cost and a size may reduced compared with a case where of the step-up type and the step-down type are formed using different ICs.

The H-bridge type step-up-or-step-down DC-DC converter performs mode switching between step-up and step-down, and controls the timing of the mode switching. In a state where the fluctuation (ripple) of the output voltage is small, and on low power, the control circuit swiftly performs the mode switching between the step-up and the step-down.

FIG. 1 illustrates an exemplary H-bridge type step-up-or-step-down DC-DC converter. The H-bridge type step-up-or-step-down DC-DC converter illustrated in FIG. 1 (hereinafter, simply referred to as a DC-DC converter) includes an H-bridge type step-up-or-step-down circuit 1, an error detector 2, a PWM comparator 3, a driver control circuit 4, a differential triangular wave signal generator 5, a switch 6, a switching comparator 7, and a reference potential source 8.

The H-bridge type step-up-or-step-down circuit 1 includes a choke coil L, a pair of transistors T1 and T2 for step-down coupled to the choke coil L, and a pair of transistors T3 and T4 for step-up coupled to the choke coil L.

For example, when, in a state where the T4 is turned on (ON) and the T3 is turned off (OFF), the T1 and the T2 are repeatedly turned on and off (ON/OFF), the H-bridge type step-up-or-step-down circuit 1 operates as a step-down mode. In a state where the T1 is turned on and the T2 is turned off (OFF), a current, headed from an input voltage VI to an output VO, flows through the inductor L. The T2 is turned on and the T1 is turned off, and hence, an electromotive force occurs so as to maintain the current, and the H-bridge type step-up-or-step-down circuit 1 operates so as to cause the current to flow to an output. By changing the duty ratio between the on/off of the T1 and the T2 at this time, the output voltage is stepped down to a desired voltage.

When, in a state where the T1 is turned on and the T2 is turned off, the T3 and the T4 are repeatedly turned on and off, the H-bridge type step-up-or-step-down circuit 1 operates as a step-up mode. In a state where the T3 is turned on and the T4 is turned off, a current flows through the inductor L. The T4 is turned on and the T3 is turned off, and hence, an electromotive force occurs so as to maintain the current. Accordingly, the H-bridge type step-up-or-step-down circuit 1 operates so as to flow the current to the output using the power-supply voltage VI. By changing the duty ratio between the on/off of the T3 and the T4, the output voltage is stepped up to a desired voltage.

A capacitor C stabilizes the output voltage VO of the H-bridge type step-up-or-step-down circuit 1.

The error detector 2 detects a difference between the voltage-divided potential of the output voltage VO and a predetermined potential e1 and outputs an error signal S1. The PWM comparator 3 compares the error signal S1 with a triangular wave signal S4 output from the switch 6, and generates a PWM signal SO. Based on the PWM signal SO and a switching signal SS output from the comparator 7, the driver control circuit 4 generates on/off control signals for the transistors T1 to T4.

The differential triangular wave generator 5 generates a differential triangular wave signal including a positive-phase triangular wave signal SP and a negative-phase triangular wave signal SM. In response to the switching signal SS, the switch 6 selects and outputs one of the positive-phase triangular wave signal SP and the negative-phase triangular wave signal SM, as the triangular wave signal S4. The switching comparator 7 compares the error signal S1 with a reference potential output from the reference potential source 8, and generates the switching signal SS. The reference potential input to the inverting input terminal of the comparator 7 may be the same as the common-mode potential of the differential triangular wave generator 5.

Figure 2:
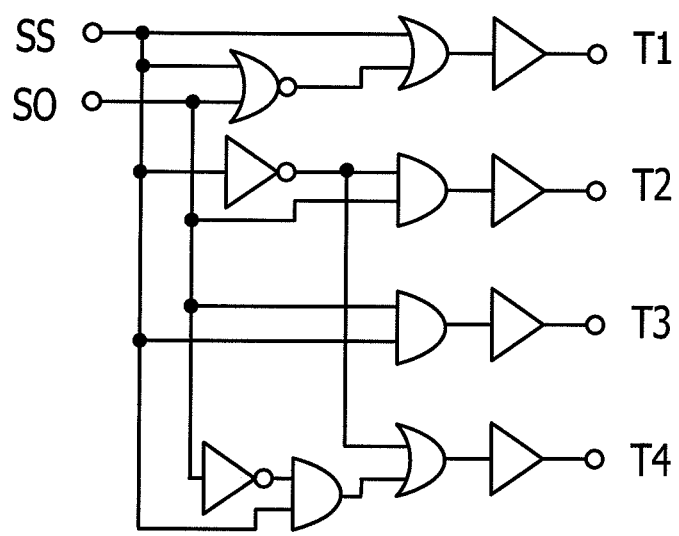
FIG. 2 illustrates an exemplary driver control circuit.

FIG. 2 illustrates an exemplary driver control circuit. The driver control circuit illustrated in FIG. 2 may be the driver control circuit 4 illustrated in FIG. 1. The driver control circuit 4 includes a logic circuit and four driver elements in a final stage. In the driver element, for example, a plurality of drive elements in which an even numbers of inverter elements are coupled in series, and, by gradually increasing the channel width of the inverter element, a driving force is improved.

Figure 3:
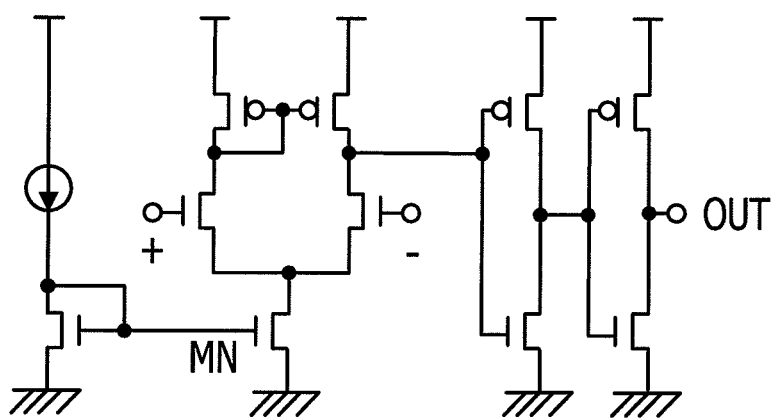
FIG. 3 illustrates an exemplary comparator.

FIG. 3 illustrates an exemplary comparator. The comparator illustrated in FIG. 3 may be the comparator illustrated in FIG. 1, and may be used as the PWM comparator 3 and the switching comparator 7.

Figure 4A:
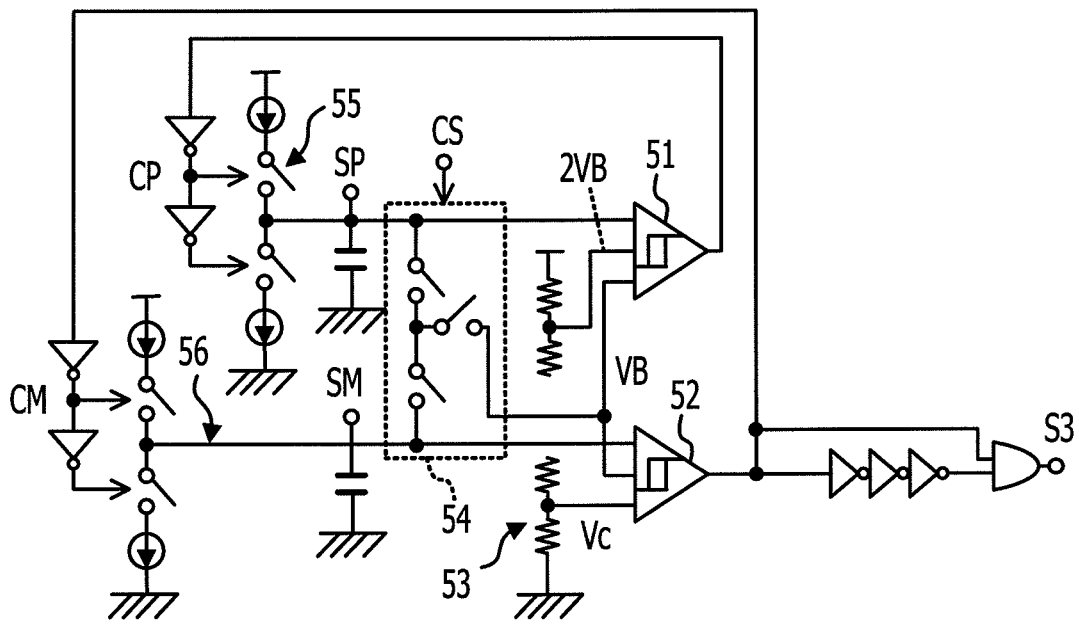
FIG. 4A illustrates an exemplary differential triangular wave generator.
Figure 4B:
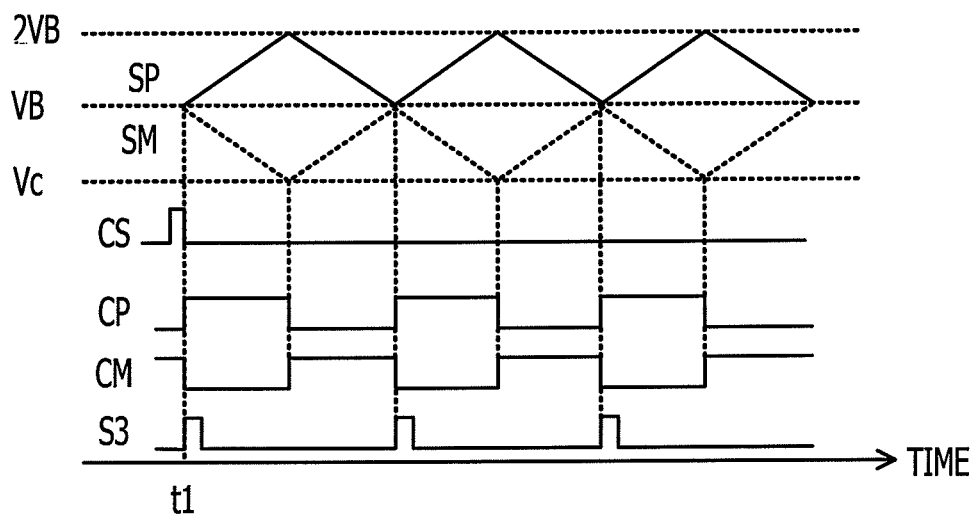
FIG. 4B illustrates an exemplary operation waveform of a differential triangular wave generator.

FIG. 4A illustrates an exemplary differential triangular wave generator. The differential triangular wave generator illustrated in FIG. 4A may be the differential triangular wave generator 5 illustrated in FIG. 1. FIG. 4B illustrates an exemplary of the operation waveform of a differential triangular wave generator.

As illustrated in FIG. 4A, the differential triangular wave generator 5 includes hysteresis comparators 51 and 52 having hysteresis characteristics, a resistor ladder 53, a switch 54, charge-discharge circuits 55 and 56 including current sources and capacitors, an auxiliary logic circuit, and a capacitor. The resistor ladder 53 includes resistors coupled in series between a high potential source and a low potential source, and generates voltage values (potentials) 2VB, VB and Vc. The potential VB may be controlled so as to coincide with the reference potential output from the reference potential source 8 illustrated in FIG. 1. When the switching comparator 7 and the differential triangular wave generator 5 are designed using CMOS circuits, the reference potential may be set so as to become an adequate operation potential, for example, the power-supply voltage/2.

As illustrated in FIG. 4B, a CS signal is input at a timing such as power activation, three switch elements between the signal terminals of SP and SM of the switch 54 are closed, and the positive-phase triangular wave signal SP and the negative-phase triangular wave signal SM are short-circuited. The hysteresis comparator 51 compares the SP with a relatively high potential. When it is determined that the SP is low, the charge-discharge circuit 55 operates as a charge circuit based on a signal CP. The SP is charged by the charge-discharge circuit 55, and the potential thereof increases until reaching the potential of the 2VB. When the SP has reached the 2VB, the determination result of the hysteresis comparator 51 is inverted, the SP is discharged by the charge-discharge circuit 55 based on the inverted signal CP, and the potential thereof decreases until reaching the potential of the VB. By repeating the above mentioned processing, the positive-phase triangular wave signal SP is generated where the VB is a base potential (the lowest potential). Since the hysteresis comparator 52 compares the short-circuited SM with a relatively low potential, it is determined that the SM is high, and the charge-discharge circuit 56 operates as a discharge circuit based on a signal CM. The SM is discharged by the charge-discharge circuit 56, and the potential thereof decreases until reaching the potential of the Vc. When the SM has reached the Vc, the determination result of the hysteresis comparator 52 is inverted. Based on the inverted CM, the SM is charged by the charge-discharge circuit 56, and the potential thereof increases until reaching the potential of the VB. By repeating the above-mentioned processing, the negative-phase triangular wave signal SM is generated where the VB is a reference potential.

A logical product of a signal obtained by delaying the signal CM and the inverted signal of the signal CM is output. Therefore, when the potentials of the two differential triangular wave signals SP and SM become the VB to coincide with each other, a pulse-shaped clock S3 is output.

Figure 5:
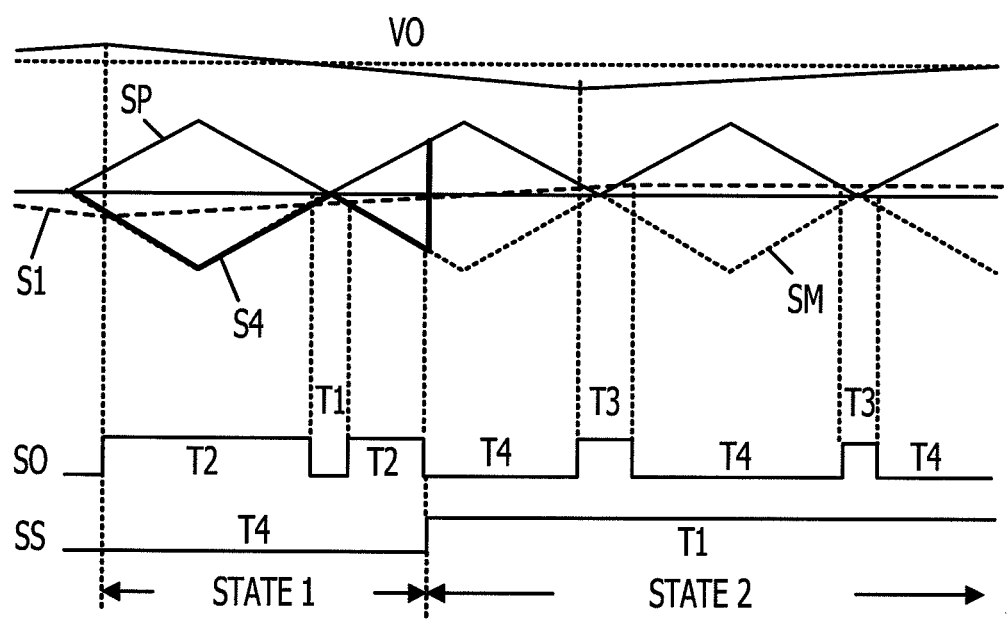
FIG. 5 illustrates an exemplary operation waveform of a DC-DC converter.

FIG. 5 illustrates an exemplary operation waveform of a DC-DC converter. The DC-DC converter may be the DC-DC converter illustrated in FIG. 1. When the output voltage VO is slightly higher than a DC potential serving as a target, the error signal S1 slightly lower than an expectation value is output from the error detector 2. The switching comparator 7 compares the S1 with the reference potential, and generates the switching signal SS. Since the S1 is low, the SS is "low (Low)" and a state 1 (State 1) is started. With respect to the differential triangular wave signals SP and SM centered on the reference potential, when the SS is Low, the SM is selected, and the SM is input, as the S4, to the inverting input terminal of the PWM comparator 3. Therefore, the PWM comparator 3 outputs, as the signal SO, a result obtained by comparing the S1 with the SM (S4). When the SS is Low, the driver control circuit 4 sets the T4 to "on" and the T3 to "off", and based on High/Low of the SO during the time period thereof, generates control signals so as to individually turn on the T2 and the T1. In the time period of the state 1 (State 1), a step-down operation is performed where the T4 is turned on, the T3 is turned off, and the T2 and the T1 are switched. By the step-down operation, the output voltage VO decreases and the S1 increases. When the S1 has exceeded the reference potential, the signal of the SS is switched by the switching comparator 7 to "high (High)", and a state 2 (State 2) is started. Switching is performed so that the SP is supplied to the inverting input terminal of the PWM comparator 3 by the switch 6, and the PWM comparator 3 starts comparing the S1 with the SP. In the same way, when the SS is High, the driver control circuit 4 sets the T1 to "on" and the T2 to "off", and based on High/Low of the SO during the time period thereof, generates control signals so as to individually turn on the T3 and the T4. Therefore, in the time period of the state 2 (State 2), a step-up operation is performed where the T1 is turned on, the T2 is turned off, and the T3 and the T4 are switched. By the step-up operation, the VO may increase, and the S1 may decrease contemporaneously. In a steady state, the switching between step-up and step-down is repeated, and a fixed voltage is substantially supplied.

The differential triangular wave signals SP and SM are supplied so that the top (maximum voltage value) of the SM and the bottom (minimum voltage value) of the SP become substantially equal to each other, and the differential triangular wave signals SP and SM are supplied so that the common-mode reference potential becomes substantially equal to the inverting input of the switching comparator 7. Therefore, when the signal S1 is higher than the reference potential, the SP is selected, and when the signal S1 is lower than the reference potential, the SM is selected. When the reference potential is changed and the common-mode potentials of the SP and the SM are shifted, the switching comparator 7 compares the shifted reference potential with the S1. Therefore, while a timing when the switching signal SS is inverted may be changed, the existence of an undetectable time with respect to the signal of the S1 may be reduced. An operation not dependent on the reference potential, for example, the DC voltage of the circuit, is executed. The occurrence of an undetectable time when the PWM signal is not generated may be reduced. The number of switching operations may be reduced, and a current consumption may be reduced. Since determination for mode selection is not performed in synchronization with a clock signal and the switching signal SS is generated in real time, the delay of occurrence of the switching signal and the occurrence of a waiting time for switching may be reduced.

Figure 6:
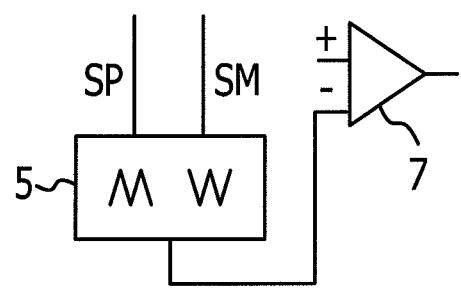
FIG. 6 illustrates an exemplary part of a DC-DC converter of FIG. 1.

FIG. 6 illustrates a part of an exemplary DC-DC converter. In the DC-DC converter part illustrated in FIG. 6, the reference potential source 8 is not used, and a potential VB generated by the resistor ladder 53 in the differential triangular wave generator 5 is supplied to the inverting input terminal of the switching comparator 7. The DC-DC converter which has the part illustrated in FIG. 6 may achieve substantially the same advantageous effect as or an advantageous effect similar to the DC-DC converter illustrated in FIG. 1.

Figure 7:
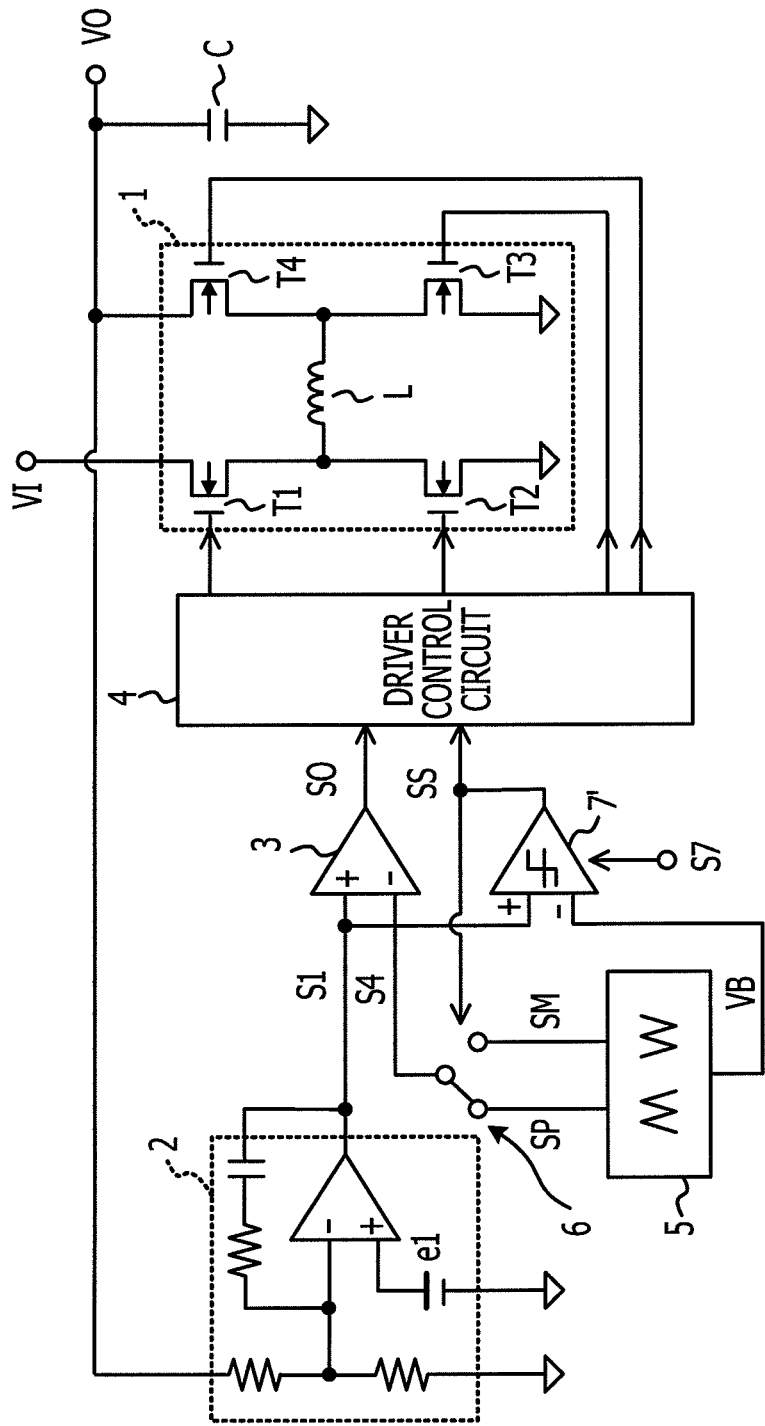
FIG. 7 illustrates an exemplary H-bridge type step-up-or-step-down DC-DC converter.

FIG. 7 illustrates an exemplary H-bridge type step-up-or-step-down DC-DC converter. In the DC-DC converter illustrated in FIG. 7, as the switching comparator 7, a dynamic operation type switching comparator 7' is used that performs comparison of an input in synchronization with a clock signal S7. In FIG. 7, the reference potential VB is supplied from the differential triangular wave generator 5 to the inverting input terminal of the switching comparator 7'.

The gate potential of an NMOS transistor MN on the lower side of a differential pair of the switching comparator 7 illustrated in FIG. 3 is supplied, as the S7, to the dynamic operation type switching comparator 7', and a current source path on the left side of the drawing may not exist. Therefore, when the clock signal S7 is High, a comparison operation is performed, and when the clock signal S7 is Low, the dynamic operation type switching comparator 7' is not enabled. Compared with the switching comparator 7 operating with a current source continuously flowing, a current consumption may be reduced. The clock signal S7 becomes active in synchronization with a time when the bottom potential of the positive-phase triangular wave signal SP and the top potential of the negative-phase triangular wave signal SM, output from the differential triangular wave generator 5, are substantially equal to each other. The clock signal S7 may be separately generated, and the clock signal S3 generated by the differential triangular wave generator 5 illustrated in FIG. 4A may be used.

Figure 8:
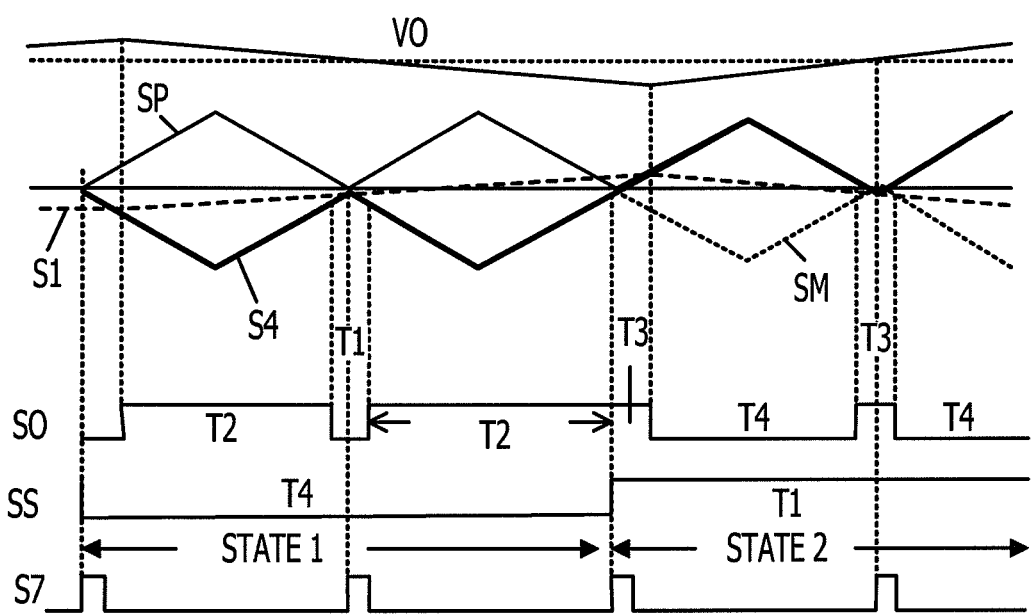
FIG. 8 illustrates an exemplary operation waveform of a DC-DC converter.

FIG. 8 illustrates an exemplary operation waveform of a DC-DC converter. The DC-DC converter may be the DC-DC converter illustrated in FIG. 7. The clock signal S7 is input in harmony with (in synchronization with) a time when the bottom potential of the positive-phase triangular wave signal SP and the top potential of the negative-phase triangular wave signal SM are substantially equal to each other. When the output voltage VO is slightly higher than a DC potential serving as a target, the S1 lower than an expectation value is output from the error detector 2. The switching comparator 7' performs comparison between the S1 and the reference potential VB at the timing of the rising edge of the clock S7, and generates the switching signal SS. Since the S1 is low, the switching comparator 7' outputs Low (the start of the State 1), and in the same way as in FIG. 5, the negative-phase triangular wave signal SM is selected as the S4. When the SS is Low, the driver control circuit 4 sets the T4 to "on" and the T3 to "off", and based on the High/Low of the SO during the time period thereof, generates control signals so as to individually turn on the T2 and the T1. Therefore, in the time period of the state 1 (State 1), a step-down operation is performed where the T4 is turned on, the T3 is turned off, and the T2 and the T1 are switched. By the step-down operation, the VO decreases and the S1 increases. Since the selection signal SS is updated every time the clock S7 is input, when an initial clock S7 has been input where the S1 has exceeded the reference potential, the signal of the SS is switched to High by the comparator 7' (the start of the State 2). The SP is supplied to the inverting input terminal of the PWM comparator 3 by the switch 6, and the PWM comparator 3 starts comparing the S1 with the SP. When the SS is High, the driver control circuit 4 sets the T1 to "on" and the T2 to "off", and based on High/Low of the SO during the time period thereof, generates control signals so as to individually turn on the T3 and the T4. Therefore, in the time period of the state 2 (State 2), a step-up operation is performed where the T1 is turned on, the T2 is turned off, and the T3 and the T4 are switched. By the step-up operation, the VO increases, and the S1 decreases at the same time. In a steady state, the switching between step-up and step-down is repeated, and a fixed voltage is supplied.

By the use of the comparator 7' performing dynamic comparison in response to a clock, a similar operation of the DC-DC converter illustrated in FIG. 1 may be executed. For example, when the clock S7 is supplied at a timing when the top and the bottom of the differential triangular waves become substantially equal to each other, the switching between the SP and the SM is performed with the same voltage. Therefore, the waveform of the S4 may become a continuous triangular wave. For example, compared with a case of being discontinuous as illustrated in FIG. 5, the number of switching operations corresponding to the changeover of switching at a discontinuous point may be reduced, and a current consumption may be reduced. Compared with a case of continuously performing comparison, by the comparator 7' that performs comparison in synchronization with a clock signal, the power consumption may be reduced.

Since the DC-DC converter illustrated in FIG. 7 is not dependent on the change of the reference potential, the DC-DC converter achieves an advantageous effect similar to the DC-DC converter illustrated in FIG. 1. In response to the input of a clock signal, switching of the differential triangular wave is performed based on the selection signal SS. Therefore, delay of the clock signal corresponding to one period or a waiting time for mode switching may be reduced.

The above-mentioned step-up-or-step-down DC-DC converter is installed in a portable device such as a wireless transmission terminal utilizing a battery cell as a power source, and supplies a power-supply voltage desired for each IC.

Figure 9:
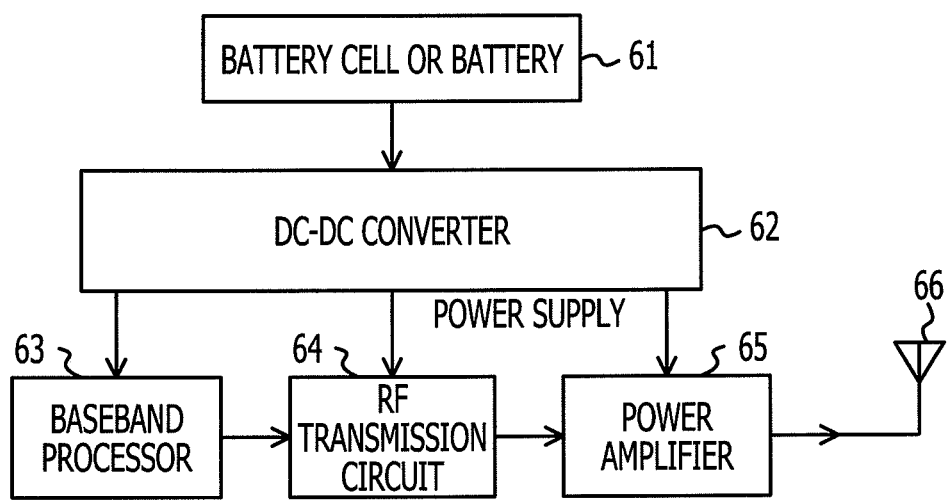
FIG. 9 illustrates an exemplary wireless transmission terminal.

FIG. 9 illustrates an exemplary wireless transmission terminal. The wireless transmission terminal illustrated in FIG. 9 includes a battery cell or battery 61, a DC-DC converter 62, a baseband processor 63, an RF transmission circuit 64, a power amplifier 65, and an antenna 66. A signal from the baseband processor (Baseband Processor) 63 is converted into an RF frequency band by the RF transmission circuit (RF transmitter) 64, amplified by the power amplifier (Power amplifier) 65, and transmitted from the antenna 66.

Based on a power source supplied from the battery cell or battery 61, the DC-DC converter 62 generates and supplies power sources desired for the baseband processor 63, the RF transmission circuit 64, and the power amplifier 65 to individual portions. As the battery cell or battery 61, a lithium-ion storage battery may be used. The voltage value of the lithium-ion storage battery is 4.2 V at the time of full charge, and the final voltage thereof is 2.5 V. Even if such a fluctuation of the power-supply voltage occurs, a power source satisfying a desired power-supply voltage value or an allowable current value has to be supplied to each IC. The DC-DC converter 62 may be formed using the same chip or the same circuit.

Since the above-mentioned DC-DC converter steps up or steps down the power-supply voltage in a wide range, the applicable range for the supply of a desired voltage or current value is wide. Since the number of switching operations is reduced, a current consumption may be reduced, and a battery life may be extended. Since the above-mentioned DC-DC converter has good responsiveness to the fluctuation of the output voltage and lowers the ripple of the output voltage, a stable power supply to each portion of a terminal may be performed.

Figure 10:
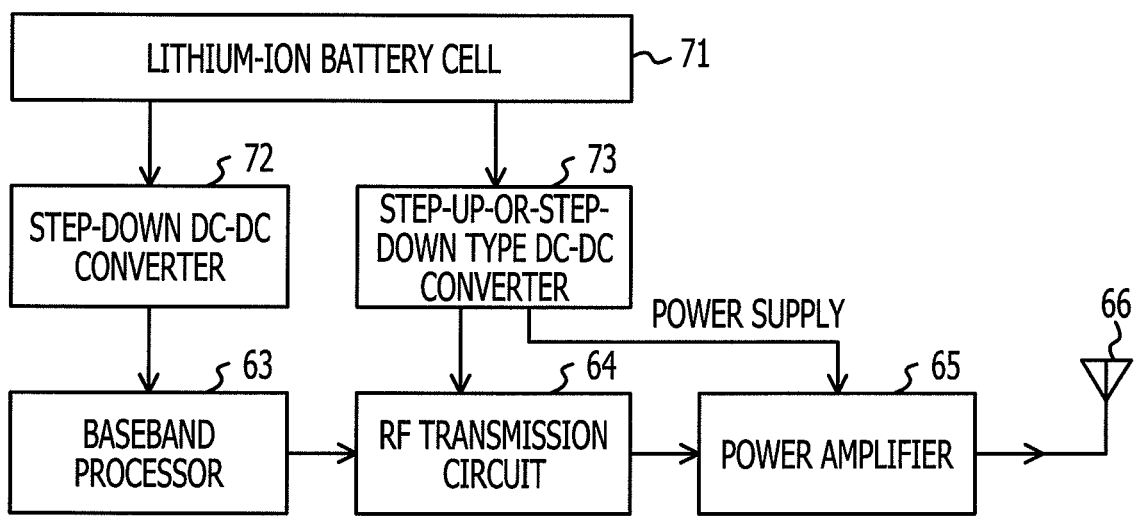
FIG. 10 illustrates an exemplary wireless transmission terminal.

FIG. 10 illustrates an exemplary wireless transmission terminal. In FIG. 10, for example, a DC-DC converter is used for a wireless transmission terminal such as a tablet terminal. The wireless transmission terminal illustrated in FIG. 10 includes a lithium-ion battery cell 71, a step-down DC-DC converter 72, a step-up-or-step-down DC-DC converter 73, a baseband processor 63, an RF transmission circuit 64, a power amplifier 65, and an antenna 66.

Using the step-down DC-DC converter 72, a power source from the lithium-ion battery cell 71 is power-supplied to the baseband processor 63 that is operable with a low voltage. By the step-up-or-step-down DC-DC converter 73, a power source is supplied to the RF circuit portions such as the RF transmission circuit 64 and the power amplifier 65, for which a power-supply voltage greater than or equal to about 3 V is desired, based on voltage accuracy or a characteristic. As the step-up-or-step-down DC-DC converter 73, the above-mentioned DC-DC converter may be used. For example, in a case where the supply voltage of the lithium-ion battery cell 71 has become 2.5 V, since the step-up-or-step-down DC-DC converter 73 effectively supplies a power-supply voltage greater than or equal to 3 V, the usage of the same battery cell may be prolonged.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A DC-DC converter comprising:
 a step-up-or-step-down circuit including a choke coil, a pair of step-down transistors coupled to the choke coil and a pair of step-up transistors coupled to the choke coil; and
 a control circuit configured to control the pair of step-up transistors and the pair of step-down transistors based on an output voltage, wherein the control circuit includes:

a differential triangular wave generation circuit configured to generate a positive-phase triangular wave signal and a negative-phase triangular wave signal;

a switch configured to select one of the positive-phase triangular wave signal and the negative-phase triangular wave signal in response to a switching signal;

an error detector configured to output an error signal according to a difference voltage between the output voltage and a certain voltage;

a PWM comparator configured to compare one of the positive-phase triangular wave signal and the negative-phase triangular wave signal that is output by the switch with the error signal and to generate, in response to a comparison result, a control pulse signal having a pulse width according to the difference voltage;

a switching comparator configured to compare the error signal with a reference potential and generate the switching signal; and a driver control circuit configured to generate a control signal for the pair of step-up transistors and the pair of step-down transistors based on the control pulse signal and the switching signal, wherein the reference potential is supplied from a common-mode potential of the differential triangular wave generation circuit to the switching comparator; and the common-mode potential is substantially equal to a minimum voltage value of the positive-phase triangular wave signal and a maximum voltage value of the negative-phase triangular wave signal.

2. The DC-DC converter according to claim 1, wherein the switching comparator is a dynamic type comparator, the dynamic type comparator operating synchronously when the clock signal is input, and a clock signal is input to the dynamic type comparator in synchronization with a timing when a minimum voltage value of the positive-phase triangular wave signal becomes substantially equal to a maximum voltage value of the negative-phase triangular wave signal.

3. The DC-DC converter according to claim 2, wherein the differential triangular wave generation circuit generates the clock signal.

4. A portable device comprising:

a main body circuit unit; and a power source, wherein the power source includes a battery cell and a DC-DC converter, the DC-DC converter includes:

a step-up-or-step-down circuit including a choke coil, a pair of step-down transistors coupled to the choke coil and a pair of step-up transistors coupled to the choke coil; and a control circuit configured to control the pair of step-up transistors and the pair of step-down transistors based on an output voltage, wherein the control circuit includes:

a differential triangular wave generation circuit configured to generate a positive-phase triangular wave signal and a negative-phase triangular wave signal;

a switch configured to select one of the positive-phase triangular wave signal and the negative-phase triangular wave signal in response to a switching signal;

an error detector configured to output an error signal according to a difference voltage between the output voltage and a certain voltage;

a PWM comparator configured to compare one of the positive-phase triangular wave signal and the negative-phase triangular wave signal that is output by the switch with the error signal and to generate, in response to a comparison result, a control pulse signal having a pulse width according to the difference voltage;

a switching comparator configured to compare the error signal with a reference potential and generate the switching signal; and a driver control circuit configured to generate a control signal for the pair of step-up transistors and the pair of step-down transistors based on the control pulse signal and the switching signal, wherein the reference potential is supplied from a common-mode potential of the differential triangular wave generation circuit to the switching comparator; and the common-mode potential is substantially equal to a minimum voltage value of the positive-phase triangular wave signal and a maximum voltage value of the negative-phase triangular wave signal.

* * * * *